United States Patent
Kawakita

(10) Patent No.: US 8,794,278 B2
(45) Date of Patent: Aug. 5, 2014

(54) PNEUMATIC TIRE

(75) Inventor: Akihiro Kawakita, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 69 days.

(21) Appl. No.: 13/392,277

(22) PCT Filed: Aug. 24, 2010

(86) PCT No.: PCT/JP2010/064271
§ 371 (c)(1),
(2), (4) Date: May 2, 2012

(87) PCT Pub. No.: WO2011/024803
PCT Pub. Date: Mar. 3, 2011

(65) Prior Publication Data
US 2012/0227882 A1    Sep. 13, 2012

(30) Foreign Application Priority Data

Aug. 25, 2009 (JP) ................. 2009-194314

(51) Int. Cl.
*B60C 11/11* (2006.01)
*B60C 11/03* (2006.01)
*B60C 11/00* (2006.01)

(52) U.S. Cl.
USPC ............ 152/209.15; 152/902; 152/209.18

(58) Field of Classification Search
USPC .............. 152/209.15, 902, 209.18, 209.25
See application file for complete search history.

(56) References Cited

U.S. PATENT DOCUMENTS

2007/0102085 A1   5/2007   Ohashi
2008/0257467 A1   10/2008  Kusano

FOREIGN PATENT DOCUMENTS

| EP | 0 393 873 | A2 | 10/1990 | |
| EP | 1 795 374 | A1 | 6/2007 | |
| EP | 1 872 974 | A2 | 1/2008 | |
| JP | 03032907 | A * | 2/1991 | ............ B60C 11/11 |
| JP | 05338416 | A * | 12/1993 | ............ B60C 11/11 |
| JP | 11157308 | A * | 6/1999 | ............ B60C 11/11 |
| JP | 2001-121926 | A | 5/2001 | |
| JP | 2001-187520 | A | 7/2001 | |
| JP | 2001-354011 | A | 12/2001 | |
| JP | 2006-089004 | A | 4/2006 | |
| JP | 2007-131085 | A | 5/2007 | |

OTHER PUBLICATIONS

Machine Translation: JP11-157308; Hino, Hidehiko; no date.*
Machine Translation: JP05-338416; Mitsutake, Toshiyuki; no date.*

(Continued)

*Primary Examiner* — Richard Crispino
*Assistant Examiner* — Kendra Shin
(74) *Attorney, Agent, or Firm* — Sughrue Mion, PLLC

(57) ABSTRACT

A pneumatic tire 1 according to the present invention comprises a plurality of land blocks 10-14 defined by circumferential grooves 2-5 extending in a tire circumferential direction and lateral grooves 6 extending in a tread width direction, wherein a stepped portion 10a-14b extending in the tread width direction is provided at at least one of circumferential edges of each of the land blocks 10-14. The stepped portion 10a-14b is formed to have the same width dimension as a width of the land block. A height of the stepped portion 10a-14b is the smallest for the land block 12 closest to a tire equator line CL and becomes gradually larger toward an outer side in the tread width direction. A maximum height of the stepped portion 10a-14b is smaller than a height of a tread surface Tr of the land block 10-14.

5 Claims, 2 Drawing Sheets

(56) References Cited

OTHER PUBLICATIONS

Summary: JP03032907A; Tomioka et al.; (No Date).*

International Search Report of PCT/JP2010/064271 dated Nov. 2, 2010.
Extended European Search Report issued in European Application No. 10811853.0 dated May 7, 2013.

* cited by examiner

PNEUMATIC TIRE

CROSS REFERENCE TO RELATED APPLICATIONS

This application is a National Stage of International Application No. PCT/JP2010/064271 filed Aug. 24, 2010, claiming priority based on Japanese Patent Application No. 2009-194314, filed Aug. 25, 2009, the contents of all of which are incorporated herein by reference in their entirety.

TECHNICAL FIELD

The present invention relates to a pneumatic tire and in particular to a pneumatic tire capable of satisfying both braking performance and driving performance on icy and snowy roads.

BACKGROUND ART

To improve on-snow performance, in some conventional pneumatic tires having multiple land blocks arranged in a tread portion, a number of sipes are disposed to increase the effect of the tread portion scratching snow (hereinafter, edge effect). However, forming the sipes lowers the rigidities of the land blocks. For this reason, techniques have been developed in which stepped portions are provided at end portions of each land block to increase the edge effect and thus improve the on-snow performance (see Patent Document 1, for example).

PRIOR ART DOCUMENT

Patent Document

Patent Document 1: Japanese Patent Application Publication No. 2007-131085

SUMMARY OF THE INVENTION

However, it is difficult to satisfy both the braking performance and the driving performance on icy and snowy roads merely by providing the stepped portions. Thus, there has always been a need for satisfaction of both the braking performance and the driving performance on icy and snowy roads.

Accordingly, the purpose of the present invention is to provide a pneumatic tire which satisfies both the braking performance and the driving performance on icy and snowy roads.

The first feature of the present invention is summarized as a pneumatic tire (pneumatic tire 1) comprising a plurality of land blocks (land blocks 10-14) defined by circumferential grooves (circumferential grooves 2-5) extending in a tire circumferential direction and lateral grooves (lateral grooves 6) extending in a tread width direction, wherein a stepped portion (stepped portion 10a-14b) extending in the tread width direction is provided at at least one of circumferential edges of each of the land blocks, the stepped portion (stepped portion 10a-14b) is formed to have the same width dimension as a width of the land block, a height of the stepped portion is the smallest for the land block (land block 12) closest to a tire equator line (tire equator line CL) and becomes gradually larger toward an outer side in the tread width direction, and a maximum height of the stepped portion is smaller than a height of a tread surface (tread surface Tr) of the land block.

According to such a feature, providing the stepped portion to each land block increases the edge effect and thus improves the on-snow performance. Specifically, the height of the stepped portion is set to be the smallest for the land block closest to the tire equator line. In the vicinity of the tire equator line, the height of the stepped portion is set to be the smallest so that the tread portion can make a large snow bar when coming into contact with the road and scraping and hardening snow thereon. Since such a snow bar contacts snow or ice on the road surface, the traction performance (driving performance) can be increased. On the other hand, a shoulder portion on an outer side in the tread width direction contributes to a high block rigidity during braking. Accordingly, a high block rigidity is maintained for the stepped portion of each land block at the outer side in the tread width direction, thereby securing the braking performance.

By setting the height for the stepped portion of the land block in the vicinity of the tire equator line to be smallest and setting the heights for the stepped portions of the land blocks at the outer sides in the tread width direction to be larger as described above, both the braking performance and the driving performance on icy and snowy roads can be satisfied.

Another feature is summarized as the pneumatic tire, wherein the stepped portion (stepped portion 10a-14b) is provided at the circumferential edge of the land block (land block 10-14) at a leading end side thereof.

Another feature is summarized as the pneumatic tire, wherein the stepped portion (stepped portion 10a-14b) is provided at the circumferential edge of the land block (land block 10-14) at a trailing end side thereof.

The present invention can provide a pneumatic tire which satisfies both the braking performance and the driving performance on icy and snowy roads.

BRIEF DESCRIPTION OF THR DRAWINGS

MODE FOR CARRYING OUT THE INVENTION

Hereinbelow, a pneumatic tire of an embodiment of the present invention will be described in detail based on the drawings. It is noted that the drawings are schematic, and the thickness, proportion, and the like of each material layer may differ from the actual ones. Therefore, specific thicknesses and dimensions shall be determined by taking the following description into consideration. Moreover, dimensional relations and proportions may be different among the drawings in some parts.

Figure 1:
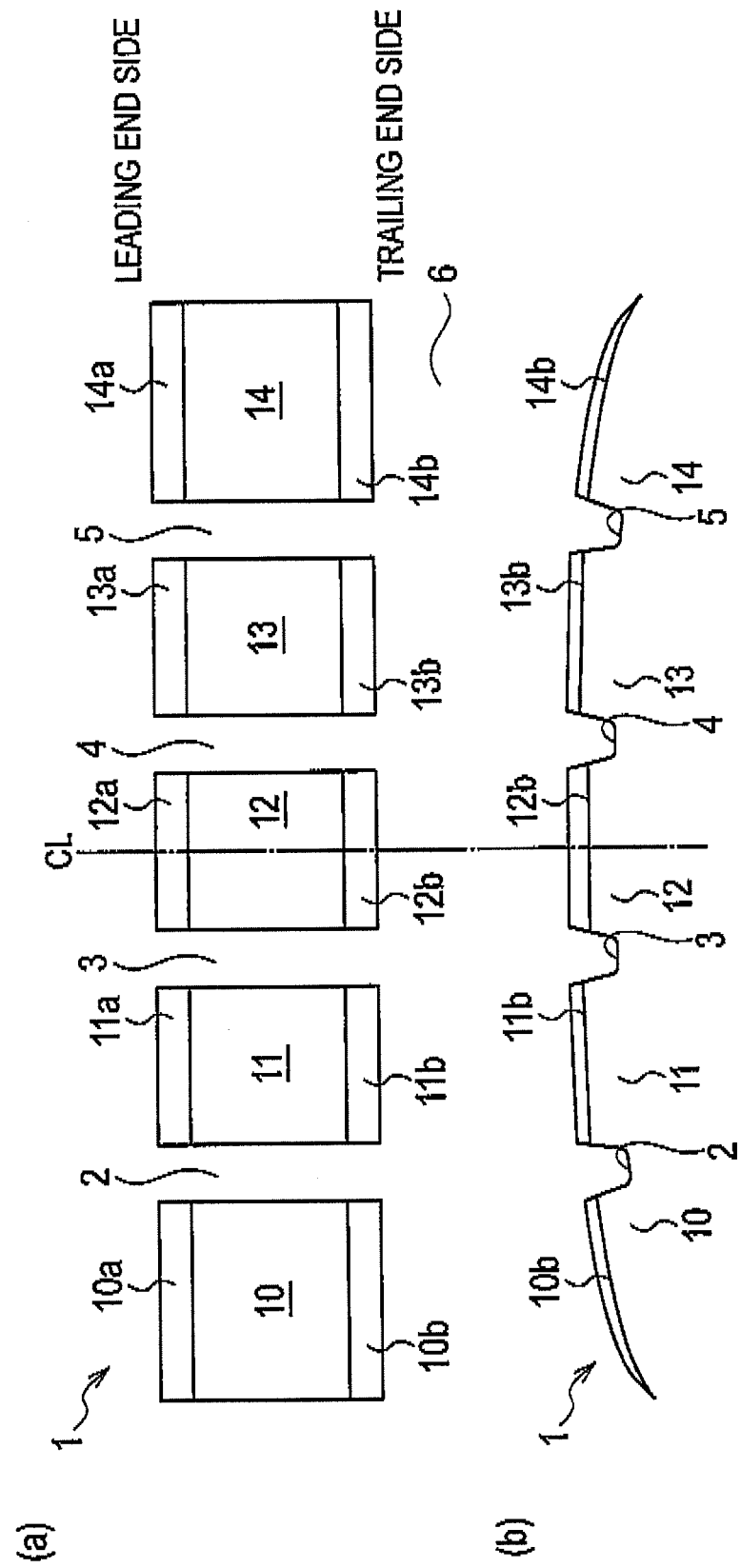
FIG. 1 shows land blocks of a pneumatic tire of the embodiment of the present invention. Part (a) is a plan view of the land blocks while Part (b) is a front view of the land blocks.
Figure 2:
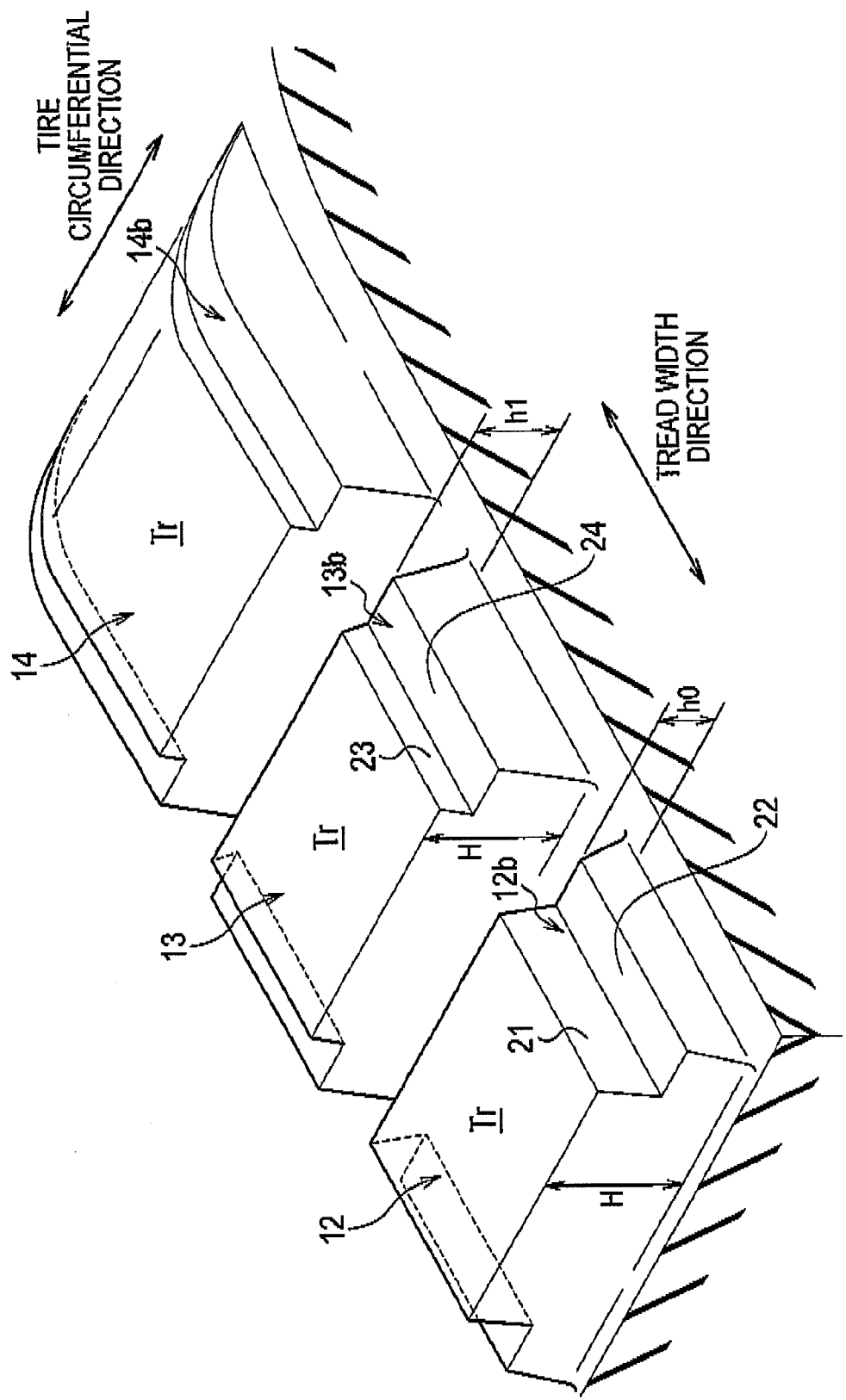
FIG. 2 is a perspective view showing the land blocks in FIG. 1.

FIG. 1 shows land blocks of a pneumatic tire of the embodiment of the present invention. Part (a) is a plan view of the land blocks while Part (b) is a front view of the land blocks. FIG. 2 is a perspective view showing the land blocks in FIG. 1.

As shown in FIG. 1, a tread portion of a pneumatic tire 1 has circumferential grooves 2, 3, 4, and 5 extending in the tire circumferential direction and multiple lateral grooves 6 extending in the tread width direction. These circumferential grooves 2 to 5 and lateral grooves 6 define multiple land blocks 10, 11, 12, 13, and 14. Stepped portions 10a, 10b, 11a, 11b, 12a, 12b, 13a, 13b, 14a, and 14b extending in the tread width direction are formed at the opposite edges (leading end side and trailing end side), in the tire circumferential direction, of these land blocks 10 to 14. As shown in Part (b) of FIG. 1, the stepped portions 10a to 14b are so formed that their maximum heights would be smaller than the height of the tread surface of the tread portion. Moreover, the stepped portions 11a to 13b are so formed that their width dimensions would be equal to those of the land blocks 11 to 13.

Further, the stepped portions 10a to 14b are formed by cutting out edge portions of the circumferential edges of the land blocks 10 to 14. To be specific, as shown in FIG. 2, the stepped portion 12b formed on the land block 12 crossing a tire equator line CL is formed by a vertical wall surface 21 extending in the radial direction and a shelf surface 22 extending in the circumferential direction. The height of a tread surface Tr of the land block 12 is set to H while the height of the stepped portion 12b, i.e., the height of the shelf surface 22, is set to h0.

Meanwhile, in the land block 13 adjacent to the land block 12, the stepped portion 13b is formed by a vertical wall surface 23 and a shelf surface 24. The height of the stepped portion 13b is set to h1. Here, the stepped portion 12b of the land block 12 is so formed that the aforementioned height h0 is smaller than the height h1 of the stepped portion 13b of the land block 13. That is, as shown in Part (b) of FIG. 1, in this embodiment, the land blocks are so formed that the height of the stepped portion of the land block closest to the tire equator line CL would be the smallest and that the height of the stepped portion increases gradually toward the outer side in the width direction.

Operation and Effect

In this embodiment, the land blocks 10 to 14 may be provided with the stepped portions 10a to 14a. This increases the edge effect and therefore improves the on-snow performance. As shown specifically in FIG. 2, the height h0 of the stepped portion 12b of the land block 12 crossing the tire equator line CL is set to be the smallest. In the vicinity of the tire equator line CL, the height h0 of the stepped portion 12b is set to be the smallest so that the tread portion can make a large snow bar when coming into contact with the road and scraping and hardening snow thereon. Since such a snow bar contacts snow or ice on the road surface, the traction performance (driving performance) can be increased. On the other hand, a shoulder portion on the outer side in the tread width direction contributes to a high block rigidity during braking. Accordingly, by forming the stepped portion 13b of the land block 13 at the outer side in the width direction with the vertical wall surface 23 and the shelf surface 24 and by setting the height h1 of the stepped portion 13b larger than h0, a high block rigidity may be maintained to secure the braking performance.

By setting the height for the stepped portion 12b of the land block 12 in the vicinity of the tire equator line CL to be smaller and the heights for the stepped portions of the land blocks 10, 11, 13, and 14 at the outer sides in the width direction to be larger, both of the braking performance and the driving performance on icy and snowy roads can be satisfied.

It should not be understood that the statement and the drawings constituting part of the disclosure of the above-described embodiment are intended to limit this invention. Various alternative embodiments, examples, and operation techniques will become apparent to those skilled in the art from this disclosure.

For example, although the stepped portions are formed at the opposite circumferential edges of each land block in the embodiment, the stepped portion may be formed at only one of the circumferential edges.

Providing the stepped portion at the trailing end side of each land block allows for improvement in the braking performance of a vehicle travelling on a snowy surface.

Moreover, providing the stepped portion at the leading end side of each land block allows for improvement in the traction performance (driving performance) of a vehicle travelling on a snowy surface.

Example

Next, the present invention will be more specifically described through an example.

In Conventional Example and Example of the present invention, pneumatic tires with a size of 245/45R17 were used as test tires. In the tire of Example of the present invention, the stepped portions 10a to 14b with a circumferential length of 1.5 mm were formed at the circumferential edges of the land blocks 10 to 14, and the stepped portions 10a to 14b were formed radially inside the tread surfaces of the land blocks 10 to 14 at heights smaller by 2 to 4 mm (see FIGS. 1 and 2). In the tire of Example of the present invention, the height of the stepped portion 12b of the land block 12 was the smallest. Note that the tire of Conventional Example was different from the tire of Example of the present invention and was the one described in the background art.

These test tires were mounted on a test vehicle (name: Mercedes-Benz (registered trademark) E320), and actual vehicle running tests were conducted. The evaluation items were dry steering stability, dry brake index, snow acceleration index, and snow brake index.

For the dry steering stability, the test vehicle equipped with each tire was driven in a dry-road test course, and each tire's steering stability was indexed (scored out of 10).

For the dry brake index, the test vehicle equipped with each tire was driven in a dry-road test course at 20 km/h. The braking distance required for the vehicle equipped with the tire of Conventional Example to stop after performing sudden braking was set to 100, and the dry brake index of the vehicle equipped with the tire of Example of the present invention was evaluated.

For the snow acceleration index, the distance required for the test vehicle equipped with the tire of Conventional Example to accelerate from a stop state to a speed of 50 km/h in a snow-road test course was set to 100, and the snow acceleration index of the vehicle equipped with the tire of Example of the present invention was evaluated.

For the snow brake index, the test vehicle equipped with each tire was driven at 20 km/h in a snow-road test course. The braking distance required for the vehicle equipped with the tire of Conventional Example to stop after performing sudden braking was set to 100, and the snow brake index of the vehicle equipped with the tire of Example of the present invention was evaluated.

TABLE 1

|  | Conventional Example 1 | Example 1 of the Present Invention |
| --- | --- | --- |
| Dry Steering Stability (index) | 6 | 6 |
| Dry Brake Performance (index) | 100 | 98 |
| Snow Acceleration Performance (index) | 100 | 127 |
| Snow Brake Performance (index) | 100 | 102 |

As is clear from the results shown in Table 1, it was found that Example of the present invention can achieve better results than Conventional Example for almost all the items.

Note that the entire contents of Japanese Patent Application No, 2009-194314, filed on Aug. 25, 2009, are incorporated herein by reference.

INDUSTRIAL APPLICABILITY

The present invention can provide a pneumatic tire satisfying both braking performance and driving performance on icy and snowy roads.

EXPLANATION OF REFERENCE SIGNS 2-5: circumferential grooves
6: lateral grooves
10-14: land blocks
10a-14b: stepped portions

The invention claimed is:

1. A pneumatic tire comprising a plurality of land blocks defined by circumferential grooves extending in a tire circumferential direction and lateral grooves extending in a tread width direction, wherein
a stepped portion extending in the tread width direction is provided at at least one of circumferential edges of each of the land blocks,
the stepped portion is formed to have the same width dimension as a width of the land block,
a height of the stepped portion is the smallest for the land block closest to a tire equator line
a maximum height of the stepped portion is smaller than a height of a tread surface of the land block;
a height of the stepped portion is measured from a bottom of an circumferential groove provided at a circumferential edge of the land block and a height of the tread surface is measured from a bottom of the circumferential groove provided at the circumferential edge of the land block;
wherein the height of the stepped portion is constant along the entire width of the land block closest to a tire equator line, and the height of the stepped portion is constant along the entire width of a land block adjacent to the land block closest to a tire equator line in a width direction and the height of the land block adjacent to the land block closest to the tire equator line is greater than the height of the land block closest to the tire equator line.

2. The pneumatic tire according to claim 1, wherein the stepped portion is provided at the circumferential edge of the land block at a leading end side thereof.

3. The pneumatic tire according to claim 2, wherein the stepped portion is provided at the circumferential edge of the land block at a trailing end side thereof.

4. The pneumatic tire according to claim 1, wherein the stepped portion is provided at the circumferential edge of the land block at a trailing end side thereof.

5. The pneumatic tire according to claim 1, wherein the bottom of a circumferential groove provided at the block closest to a tire equator line is at a same height as a bottom of a circumferential groove provided at an outer side in the tread width direction.

* * * * *